Patented Sept. 9, 1952

2,610,206

UNITED STATES PATENT OFFICE 2,610,206

MANUFACTURE OF METHYL LACTATE

Hugh Campbell Highet and Francis Edward Salt, Banstead, England, assignors to The Distillers Company Limited, Edinburgh, Scotland, a British company No Drawing. Application October 1, 1949, Serial No. 119,193. In Great Britain October 9, 1948

7 Claims. (Cl. 260—484)

The invention relates to a process for the manufacture of methyl lactate.

The use of pure lactic acid for a great variety of purposes such as in the manufacture of pharmaceuticals and as an acid in the manufacture of food products is well known. It is also used largely in beverages in the place of citric acid. In addition it has recently been suggested to use the acid or its esters as plasticisers in the casting of phenolic resins. Although crude dilute lactic acid is inexpensive, occurring as it does in fermentation liquors the high cost of relatively pure acid may be attributed largely to the difficulties encountered in its purification.

It is known that a lactic acid of a high degree of purity may be produced by the esterification of crude lactic acid with methanol and the subsequent hydrolysis of the methyl lactate thus obtained. However, the preparation of methyl lactate in high yields by conventional methods such as the well known direct esterification is unusually difficult, as has been stated as recently as 1945 (Ind. Eng. Chem. 37, page 388), the reason being that the methyl lactate distils azeotropically with water but methanol does not, and methyl lactate is readily hydrolysed.

It is an object of the present invention to produce methyl lactate in a simple manner with good yields. It is another object to carry out the production not only in a batch wise manner but also in a continuous manner. It is a further object to devise a process wherein the impure lactic acid used as starting material is not necessarily in the anhydrous state so that an acid which contains considerable quantities of water can be used for the production of the ester.

According to the present invention the process of manufacturing methyl lactate comprises heating lactic acid containing 2%–50% of water, and methanol to a temperature between 180° and 235° C. at a pressure sufficient to keep a major part of the methanol in the liquid phase. The reaction mixture is maintained at these temperatures for between about 30 and about 60 minutes.

The process is most advantageously carried out at temperatures between 200 and 220° C. Preferably the molar ratio of the lactic acid to the methanol is between 1:1 and 1:5.

The lactic acid used for the process may be in the anhydrous or in the dehydrated form but it may also contain considerable quantities of water, for instance up to 50% by weight. By dehydrated lactic acid is understood a product which consists mainly of lactyl and higher polylactyl lactic acids.

It has been found that the esterification process according to the present invention proceeds with great ease, even in the absence of such acidic esterification catalysts as boric acid, phosphoric acid, toluene sulphonic acid and sulphuric acid. The presence of such esterification catalysts, on the other hand, does not influence the process disadvantageously.

When the lactic acid has been dehydrated previous to the esterification process by means of entraining liquids such as benzene and toluene, the presence of appreciable amounts of these entraining liquids retained by the dehydrated acid does not influence to any extent disadvantageously the esterification process.

The process of the present invention may preferably be carried out in a continuous manner. In such a continuous process, the lactic acid and the methanol are introduced into a heated reaction zone, the dimensions of which and the rate of flow through the reaction zone being adjusted to give a residence time therein of about 30 to about 60 minutes. The most convenient way of carrying out the continuous process in practice is to use as a reaction zone a long narrow tube, in the shape of a coil and made of mild, preferably of a stainless steel, which is capable of withstanding the high pressures used.

The methyl lactate produced according to the process of the present invention is recovered from the reaction mixture by any of the well known methods, for instance by distillation.

The following examples illustrate the way in which the process of the invention may be carried out.

Example 1

A mixture of 5 mols of methanol and 1 mol of lactic acid of about 98% concentration was introduced into a 30 feet long mild steel coiled tube of ¼ inch inner diameter at such a rate that the residence time of the mixture in the coil was 40 minutes. The coil was placed in an oil bath which was heated to 220° C. The pressure at the coil inlet was 21 atmospheres. The yield of methyl lactate obtained by rapid fractional distillation of the reaction product was 82% of the theoretical yield.

Example 2

The mixture consisted of lactic acid containing 20% by weight of water, and methanol in the same ratio as used in Example 1, to which was added para toluene sulphonic acid in an amount of 0.009 mol per mol of lactic acid. The coil reactor was the same as used in Example 1. The temperature in the coil was maintained at 220°

C. and the pressure at its inlet at 23 atmospheres. The yield of methyl lactate was 92%.

What we claim is:

1. Process for the manufacture of methyl lactate which comprises heating lactic acid containing 2 to 50% of water, and methanol at a temperature between 180° and 235° C. and at a pressure sufficient to keep a major part of the methanol in the liquid phase and maintaining the reaction mixture at said temperature for between about 30 to 60 minutes.

2. Process according to claim 1 wherein the temperature is between 200 and 220° C.

3. Process according to claim 1 wherein the molar ratio of lactic acid to methanol is between 1:1 and 1:5.

4. Process according to claim 1 wherein the lactic acid contains dehydrated lactic acid.

5. Process according to claim 1 which is characterised by the presence in the reaction mixture of acidic esterification catalysts.

6. Continuous process according to claim 1 wherein the reaction mixture is passed through a heated reaction zone of a length and at a rate such that the passage therethrough requires from about 30 to 60 minutes.

7. Continuous process according to claim 6 wherein the reaction zone consists of a long narrow passageway.

HUGH CAMPBELL HIGHET.
FRANCIS EDWARD SALT.

REFERENCES CITED

The following references are of record in the file of this patent:

UNITED STATES PATENTS

| Number | Name | Date |
|---|---|---|
| 2,331,094 | Loder | Oct. 5, 1943 |
| 2,405,646 | Filachione et al. | Aug. 13, 1946 |